March 1, 1966 R. F. THIELMAN 3,237,890
INTEGRATED THRUST VECTOR CONTROL SYSTEM
Filed March 9, 1961 6 Sheets-Sheet 3
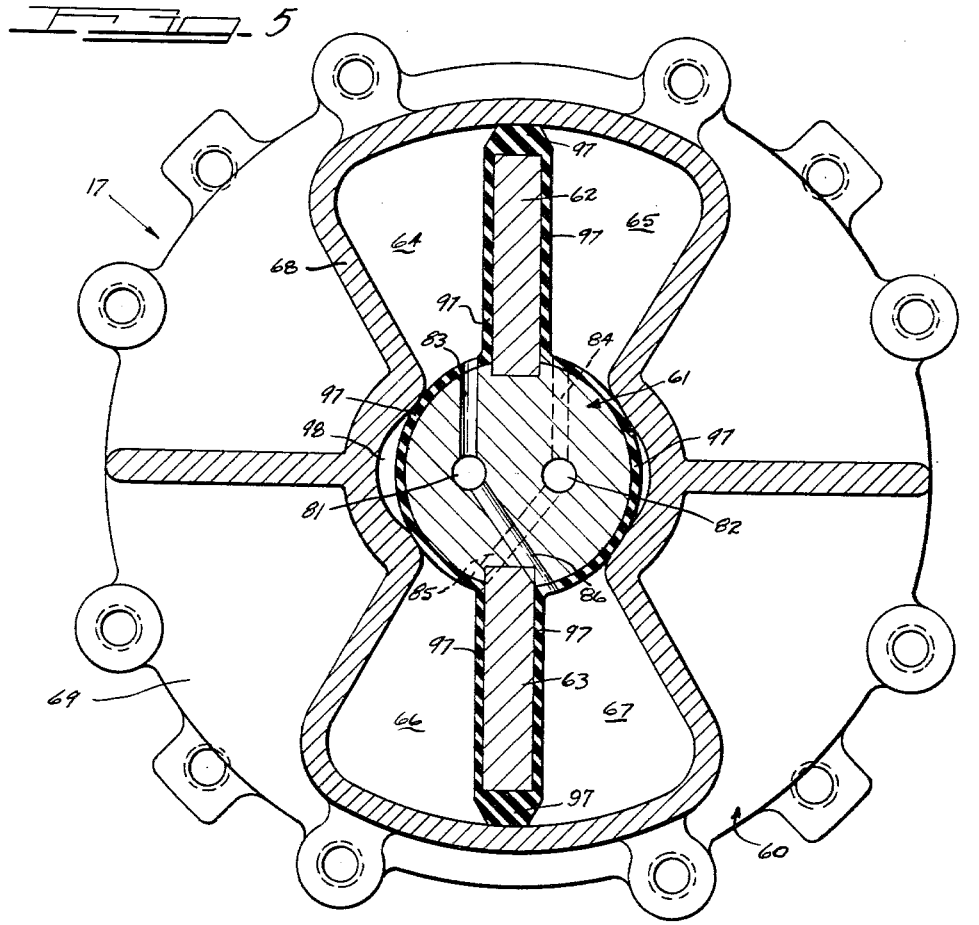
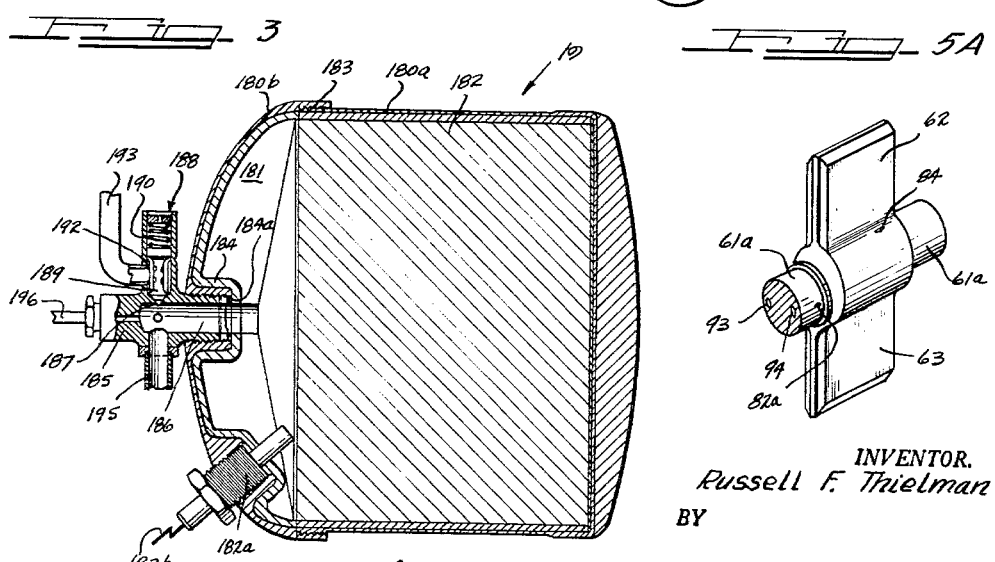
INVENTOR.
Russell F. Thielman
BY
Hill, Sherman, Meroni, Gross & Simpson ATTORNEYS March 1, 1966
R. F. THIELMAN
3,237,890
INTEGRATED THRUST VECTOR CONTROL SYSTEM
Filed March 9, 1961
6 Sheets-Sheet 4
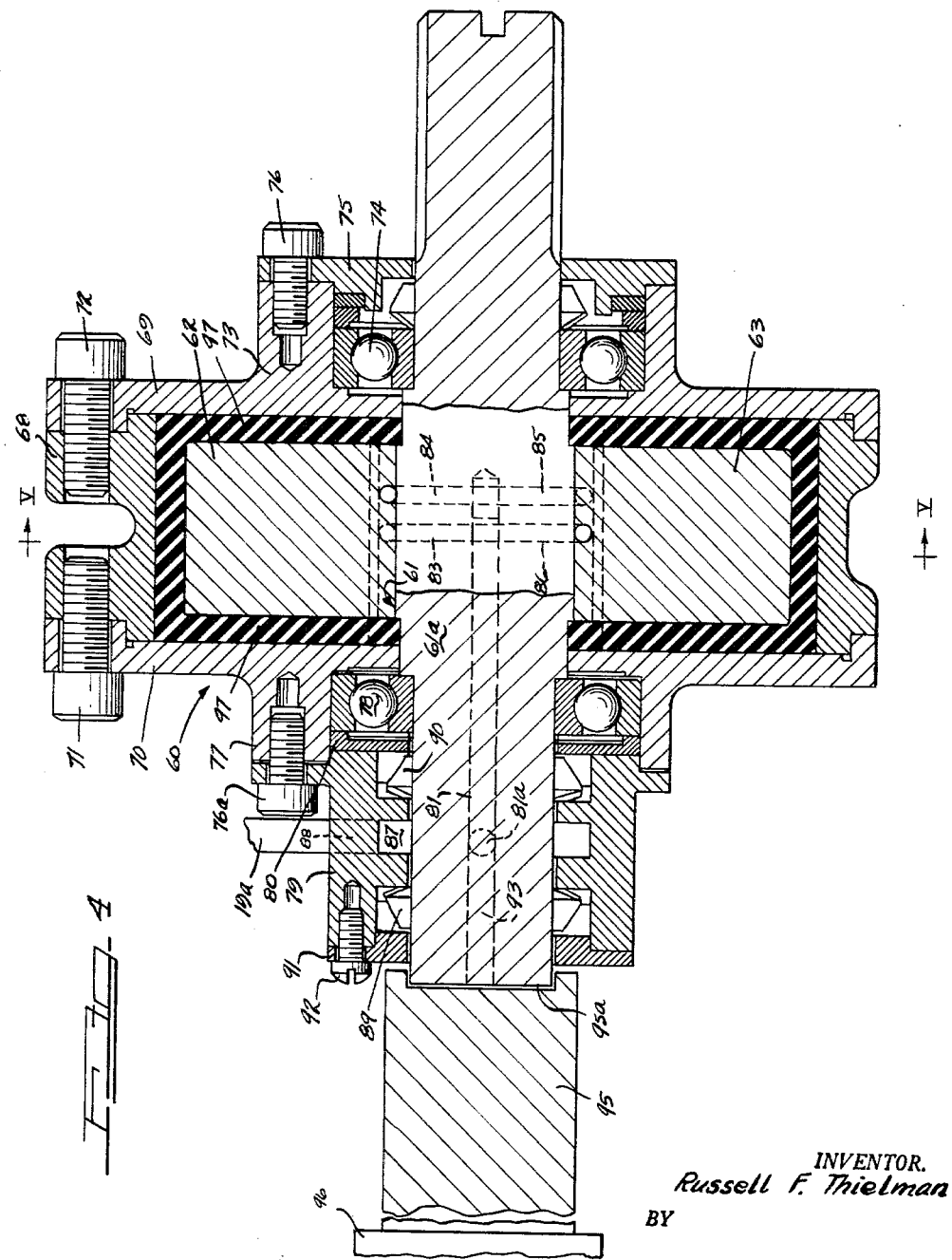
INVENTOR.
Russell F. Thielman
BY
Hill, Sherman, Meroni, Gross & Simpson ATTORNEYS

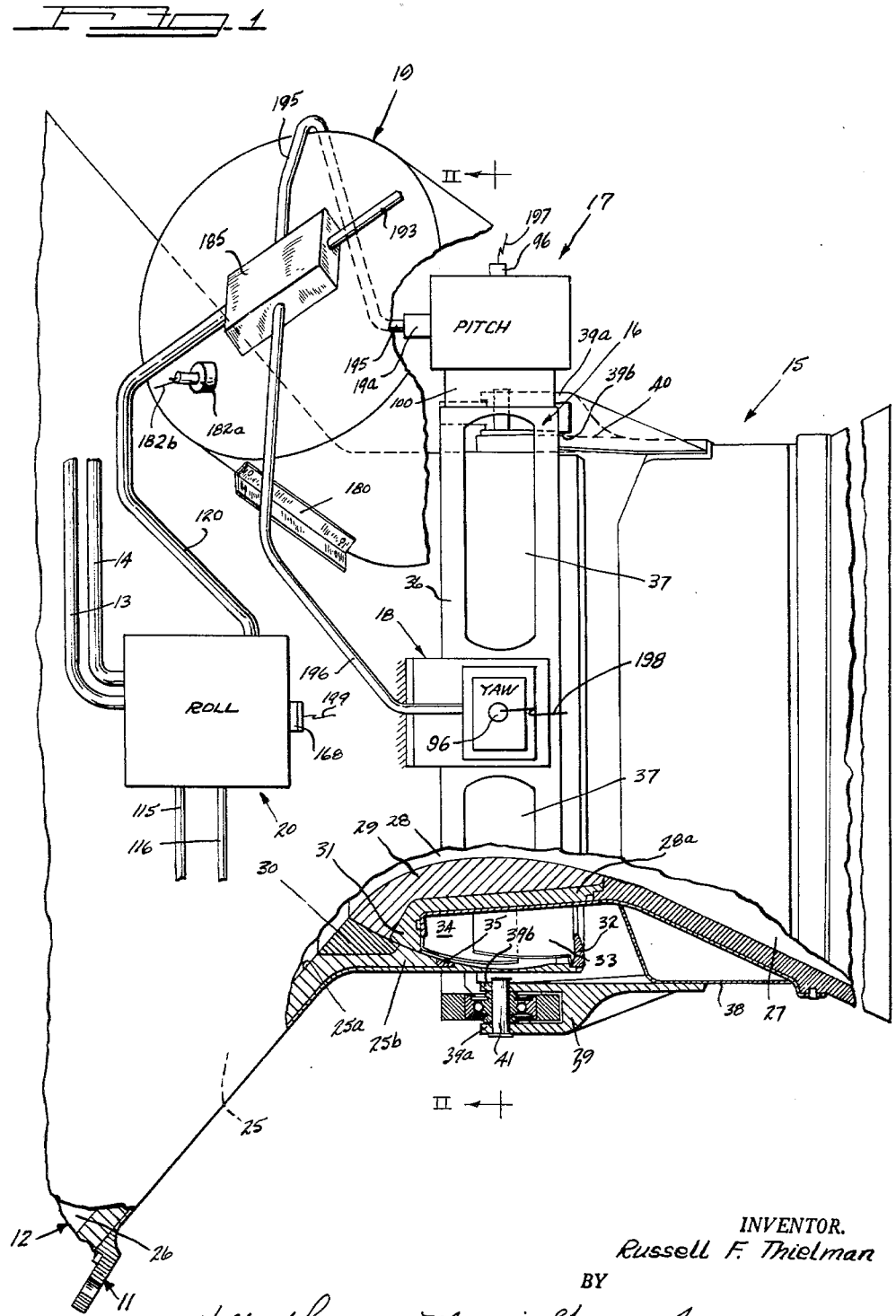

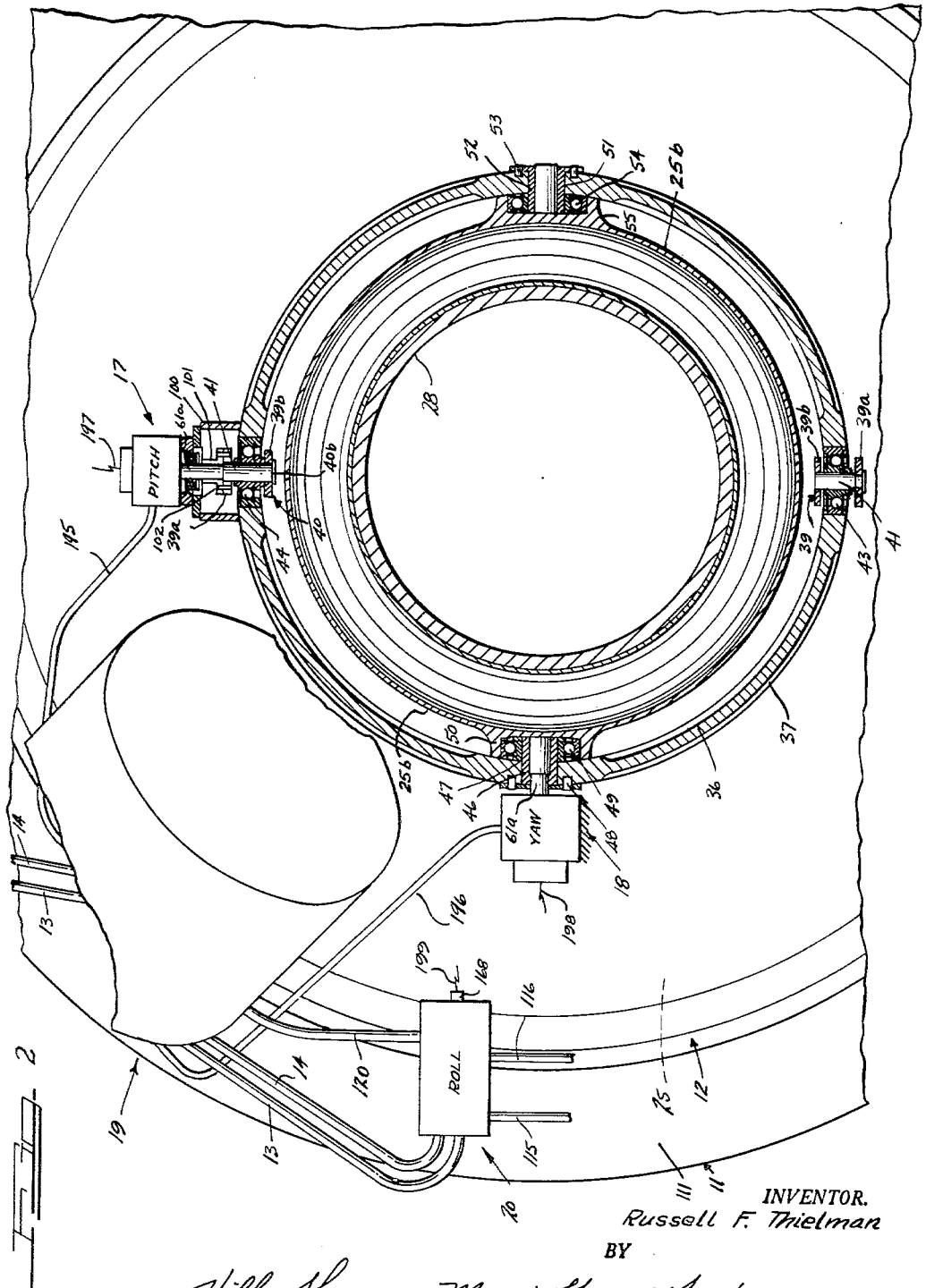

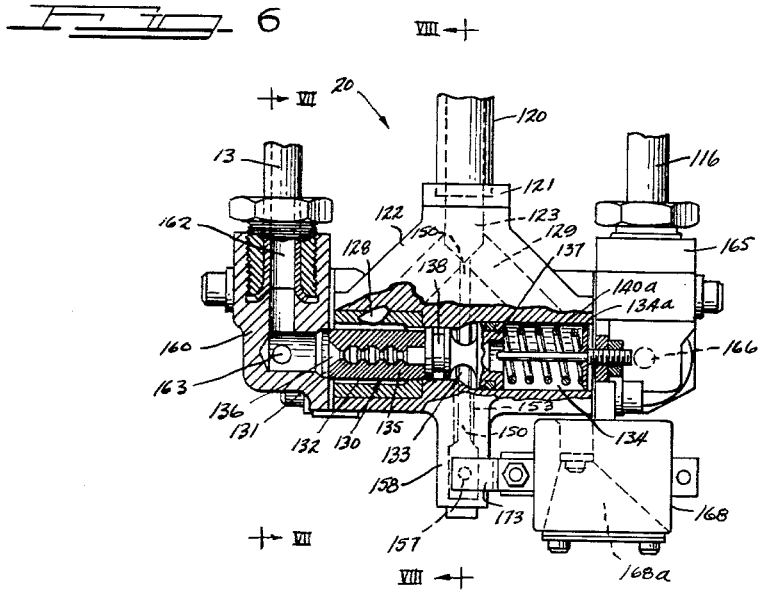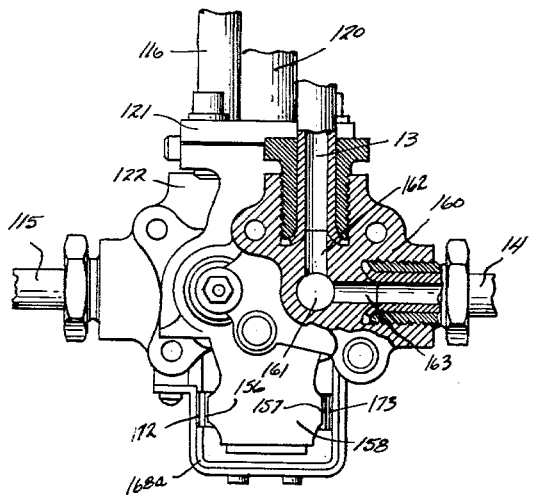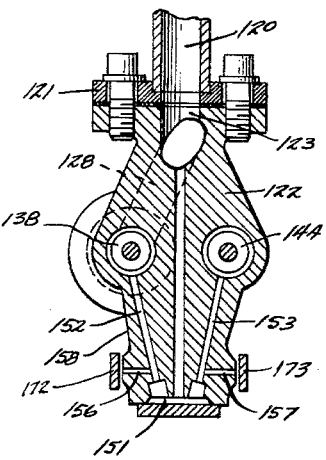

March 1, 1966  R. F. THIELMAN  3,237,890
INTEGRATED THRUST VECTOR CONTROL SYSTEM
Filed March 9, 1961  6 Sheets-Sheet 6

INVENTOR.
Russell F. Thielman
BY
Hill, Sherman, Meroni, Gross & Simpson
ATTORNEYS United States Patent Office 3,237,890
Patented Mar. 1, 1966

3,237,890
INTEGRATED THRUST VECTOR
CONTROL SYSTEM
Russell F. Thielman, Cleveland, Ohio, assignor to TRW
Inc., a corporation of Ohio
Filed Mar. 9, 1961, Ser. No. 94,588
5 Claims. (Cl. 244—52)

This invention relates to air and space borne vehicles and is more particularly directed to improved methods and means adapted for controlling the attitude of such a vehicle about the pitch, yaw and roll axes.

Heretofore, difficulty has been encountered in the design of attitude control systems in that the components thereof were quite complicated and added considerably to the weight of the vehicle. Reliability of the attitude control system, and, hence, the reliability of the overall missile system, was affected by the requirement for such complicated components, and the weight of such components was a limiting factor in other design criteria influencing the limits of other parameters, for example, the weight of the war head, nozzle, and reaction motor.

With the present invention, I substantially overcome the problems and difficulties of the prior art and provide small size components of, and substantially reduce the weight of, the attitude control system of an air or space borne vehicle.

It is, therefore, an object of the present invention to provide an improved attitude control system for air and space borne vehicles.

Another object of the present invention is to provide an improved attitude control system for air and space borne vehicles employing a gimbaled primary gas discharge nozzle.

Still another object of the present invention is to provide improved attitude control systems for air and space borne vehicles which employs a single auxiliary pressurization system for tilting the main gas discharge nozzle of the vehicle about control axes parallel to the pitch and yaw axes of the vehicle.

A further object of the present invention is to provide improved attitude control systems employing a single source of a pressurized medium for actuating servomotors for selectively tilting the main gas discharge nozzle of an air or space borne vehicle with respect thereto and for selectively actuating nozzle means for controlling the vehicle about the roll axis.

A still further object of the present invention is to provide improved methods for controlling the attitude of air and space borne vehicles.

These and other objects, features and advantages of the present invention will become more apparent from a careful consideration of the following detailed description, when considered in conjunction with the accompanying drawings illustrating a preferred embodiment of the present invention and wherein like reference numerals and characters refer to like and corresponding parts throughout the several views.

On the drawings:

FIGURE 1 is a fragmentary elevational view in partial section of the attitude control system of the present invention mounted on a reaction motor.

FIGURE 2 is an end view of the attitude control system of FIGURE 1 along lines II—II of FIGURE 1.

FIGURE 3 is a view in longitudinal section of a gas generator found useful in the practice of the present invention.

FIGURE 4 is a longitudinal section of a pitch and yaw actuator device.

FIGURE 5 is a view in section taken along lines V—V of FIGURE 4 and FIGURE 5a is a perspective view of the actuator rotor.

FIGURE 6 is an enlarged view in partial section of roll control means constructed in accordance with the present invention.

FIGURE 7 is a view taken along lines VII—VII of FIGURE 6.

FIGURE 8 is a view taken along lines VIII—VIII of FIGURE 6.

As shown on the drawings:

Figure 10:
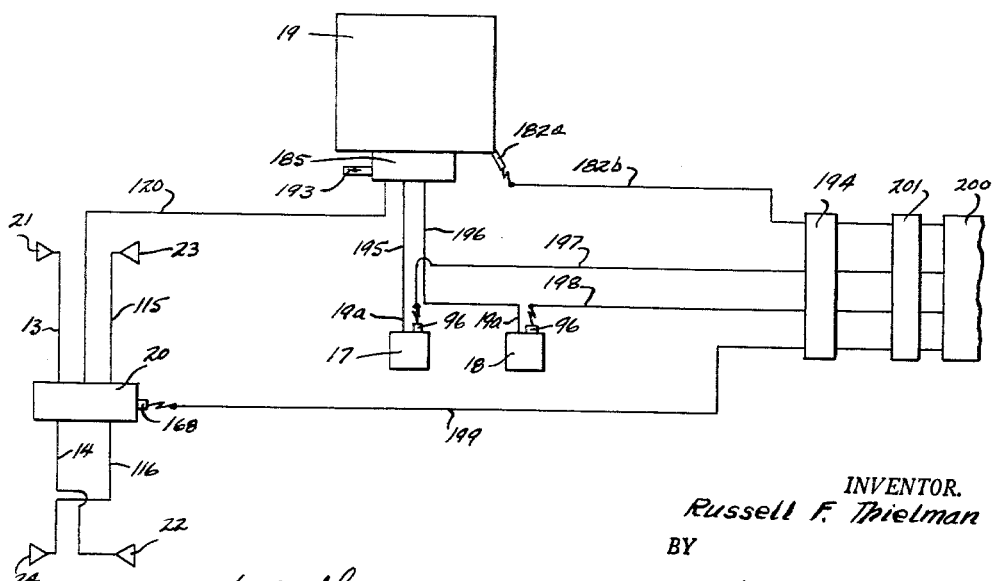
FIGURE 10 is a schematic view of the attitude control system of the present invention.

While the present invention has a variety of applications, FIGURES 1, 2 and 10 illustrate an embodiment of this invention for controlling the attitude or orientation of an air or space borne vehicle 11 in flight.

The attitude control system includes a nozzle assembly 15, a gimbal arrangement 16 mounting the nozzle assembly, a servo mechanism for selectively controlling operation of an actuator assembly 17 for controlling the attitude of the vehicle 11 about a first axis such as the pitch axis and an actuator assembly 18 for controlling the attitude of the vehicle about a second axis such as the yaw axis. The servomechanism includes a source of a pressurized medium, such as a gas generator 19 for supplying the pressurized medium to the actuator assemblies 17 and 18. A single valve assembly 20 is provided for flowing a portion of the pressurized medium from the gas generator into two pairs of opposed control nozzles 21, 22 and 23 and 24 for controlling rolling moment of the vehicle in both a clockwise and counterclockwise direction (FIGURE 10). The servomechanism is actuated by signals received from a remote source, such as the guidance unit (FIGURE 10) or initially from the ground equipment (FIGURE 10).

Nozzle assembly

The nozzle assembly 15 is constructed in two parts to enable gimbaled support of the throat and nozzle exit portion.

The nozzle assembly 15 includes a nozzle entrance portion 25 communicating with the reaction chamber 26 of the reaction motor 12 propelling the vehicle 11. The wall 25a of the nozzle entrance portion is convergingly tapered from the reaction chamber 26 and is provided at its end remote from the reaction chamber with an annular or cylindrical discharge sleeve 25b.

The second portion of the nozzle assembly includes the nozzle exit portion 27 and throat portion 28. A throat insert 29 constructed of refractory material, such as graphite, may be provided and cooperates with an annular insert 30 secured in a groove formed in the nozzle entrance portion 25 to cooperate with the insert 29 in defining surface continuities facilitating flow of exhaust gases axially through the nozzle assembly.

The wall 28a of the throat portion is provided with an outturned flange 31 adjacent the nozzle entrance portion sleeve 25b.

The sleeve 25b carries adjacent the throat portion an inturned flange 32. Spaced radially inwardly from the nozzle entrance portion sleeve 25b and extending upward or axially inwardly from the flange 32 and carried thereby is a cup-shaped sleeve 33 of resilient material. The throat flange 31 carries adjacent the nozzle entrance portion a cup-shaped sleeve 34 of resilient material which extends downwardly or axially outwardly therefrom and between the sleeve 25b and the flexible member 33.

The flexible members 33 and 34 cooperate to provide a ball and socket type joint to enable gimbaled support of the nozzle throat and exit portion for movement relative to the nozzle entrance portion about control axes parallel to the pitch and yaw axes of the vehicle. A seal 35 prevents flow of exhaust gases between the sleeve 25b and annular flexible member 34.

Gimbal arrangement

The gimbal arrangement 16 includes a gimbal ring 36 located adjacent the throat portion of the nozzle assembly and is provided with a plurality of longitudinal slots 37 to reduce the weight of the ring.

Mounted on the outer wall 38 of the nozzle assembly is a pair of U-shaped journal members 39 and 40. The uprights 39a and 39b of each member 39 and 40 are spaced and apertured to receive a pin 41 pivoted by a pair of bearings 43, 44 on the gimbal ring 36 for swiveling the nozzle exit portion 27 and the throat portion 28 about a control axis parallel to the pitch axis of the vehicle. As clearly appears in FIGURE 2, bearings 43 and 44 are mounted in the ring 36 to enable swiveling of the nozzle exit portion about the pitch control axis.

The ring 36 is also apertured as at 46 to receive a sleeve 47 which is secured thereto as by screws 48. The sleeve 47 is sized to extend through the aperture 46 and is journaled in bearings 49 maintained in a boss 50 formed on the outer wall of the sleeve 25b. At a position diametrically opposite the aperture 46 the ring 36 is apertured as at 51 to receive a sleeve 52 secured thereto as by screws 53 and is journaled in bearings 54 maintained in a boss 55 on the nozzle sleeve 25b. The sleeves 47 and 52 enable tilting of the ring 36 about a second control axis which may be parallel to the yaw axis of the vehicle 11, and which is perpendicular to the first described control axis.

Pitch and yaw actuator units

The pitch actuator unit 17 and yaw actuator unit 18 are identical in construction and operation. The following description, therefore, of the pitch actuator unit 17, it will be appreciated, is equally applicable to the description of the yaw actuator unit 18.

The actuator unit 17 comprises, in general as appears in FIGURES 4, 5 and 5a, a housing 60 defining a pair of branch chambers radiating from a centrally located chamber which is adapted to receive a rotor 61, the shaft 61a of which carries a pair of diametrically opposed vanes 62 and 63. Vane 62 separates one of the branch chambers into a pair of opposed pressurized medium compartments 64 and 65, whereas vane 63 separates the other branch chamber into a pair of compartments 66 and 67 (FIGURE 5).

The actuator housing 60 may be constructed in three major sections including a central section 68 and end plates 69 and 70 assembled as by suitable securing means 71 and 72 (FIGURE 4).

End plate 69 may be provided with a suitable boss 73 adapted to receive shaft bearing means 74. A closure plate 75 is provided and is secured to the boss 73 as by screws 76. Similarly, end plate 70 is provided with a boss 77 adapted to receive shaft bearing means 78.

A removable housing 79, spaced from the bearing means 78 by a divider 80, is secured to the boss 77 as by screws 76a and is employed for introducing the pressurized medium from a pressure source, such as the gas generator 19 through a conduit 19a and through a pair of actuator shaft formed passages 81 and 82. Passages 81 and 82 communicate branch passages 83–86 into the vane compartments 64, 65, 66 and 67, respectively (FIGURE 5). For this purpose, housing 79 is provided with an annular passage 87 communicating with the branch passages 81a and 82a and an inlet passage 88 which may be positioned for tangentially introducing the pressurized medium into passage 87. Appropriate seal means 89 and 90 are provided to prevent leakage from passage 87 across the rotor shaft 61a. An end plate 91 secured to housing 79 by suitable means, such as screws 92, completes the assembly.

Pressure conditions, and thus oscillatory movement of the vanes and rotor shaft, may be controlled by varying the pressure conditions in passages 81 and 82, respectively. A pair of bleed outlets 93 and 94 communicating with compartments 64–67 via supply passages 81 and 82, respectively, are provided for this purpose. Thus, by blocking the discharge area of one of the outlets 93 or 94, pressure will be increased in the vane compartments communicating therewith and cause movement of the rotor in the direction of low pressure. Similarly, subsequent blocking of the other bleed outlet will tend to equalize pressure in the compartments on both sides of the vanes and return the rotor to its original position relative to the housing (FIGURE 5a).

Alternately, means such as a torque motor shaft 95 having a cam surface complementary to a cammed surface provided on the end 95a of the actuator shaft 61a may be employed to effect pressure changes in the bleed outlets 93 and 94 respectively. For example, when the torque motor 96 (FIGURE 4) is energized causing rotation of the shaft 95, the area ahead of one of the bleed outlets will be opened and the area behind the other bleed outlet will be closed proportionately, thereby causing a pressure differential in the bleed outlets, assuming that the original relationship between the cam surface of the torque motor shaft and cam surface of the actuator shaft was such as to provide equal pressure conditions in the pair of bleed outlets.

In order to seal along the outer peripheral surfaces of the vanes, and prevent passage of pressurized medium from one compartment to the other or along the rotor shaft, the rotor shaft and vanes may be coated with an elastomeric material 97.

The centrally located rotor housing chamber 98 is provided with an arcuate inner surface constructed so that only line contact at four equidistant points in section is made between the housing and rotor seal means (FIGURE 5). Thus a continuous seal is provided between the housing and rotor regardless of the relative position of the rotor in the housing.

As appears in FIGURE 2, the rotor housing 60 is mounted on the ring 36 by a bracket 100.

The rotor shaft 61a is splined to a sleeve 101 which is secured as by screws 102 to the bracket upright 39a for moving the nozzle about the pitch control axis (FIGURE 2). The yaw actuator unit 18 has its shaft 61a connected to sleeve 47 fixed to the gimbal ring 36 for moving the nozzle and ring about the yaw control axis.

The retaining ring 40b prevents unlimited translation of the pin 41.

Thus, means are provided for moving the nozzle about the pitch control axis. The shaft 61a of the yaw actuator unit 18 is splined to sleeve 47 for movement of the ring 36 and nozzle about the yaw control axis.

Thus means are provided for actuating movement of the nozzle about the pitch and yaw control axes to thereby control the attitude or orientation of the vehicle with which associated about its pitch and yaw axes.

Roll control system

The roll control system includes the pairs of opposed control nozzles 21 and 22 and 23 and 24 and the single valve assembly 20 for selectively controlling flow to the pairs of opposed nozzles for controlling rolling moment of the vehicle in clockwise and counterclockwise directions.

The nozzles 21 and 22 are mounted on the rear end or rear wall 111 of the vehicle and are employed to control or counteract rolling moment of the vehicle in the counterclockwise roll direction as viewed in FIGURE 2 by providing a torque in the clockwise direction, whereas the nozzles 23 and 24 are employed for controlling or counteracting rolling moment of the vehicle in the clockwise roll direction as viewed in FIGURE 2 by providing an opposite torque.

Referring to FIGURES 6–10 a pressurized medium may be fed to the nozzles 21 and 22 through a pair of conduits 13 and 14 from a roll control valve device, generally indicated by the numeral 20, mounted on the rear wall of the vehicle, and, similarly, the roll control nozzles 23 and 24 may be supplied the pressurized medium through conduits 115 and 116 from the roll control device 20.

Figure 9:
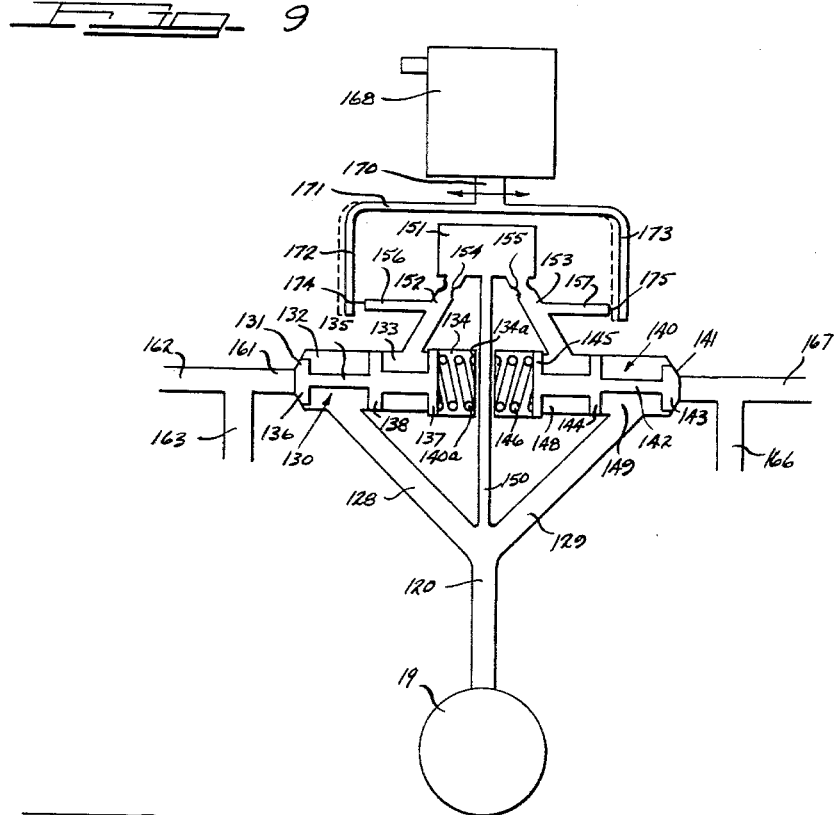
FIGURE 9 is a schematic view of the roll control means of FIGURE 6.

Referring to FIGURES 6–9, and particularly to FIGURE 6, there is shown an inlet conduit 120 secured as by a fitting 121 to a housing 122 which is passaged as at 123 shown by the dotted lines, and the conduit 120 may be connected at its other end to the gas generator 19 for supplying the pressurized medium, such as hot gases to the pasage 123 (FIGURE 9).

Housing passage 123 communicates with a pair of passages 128 and 129 defining a Y in cross section. Passage 128 communicates with a chamber 130 formed in the housing 122 and which has an outlet 131. The chamber 130 is separated into three compartments 132, 133 and 134 (FIGURE 6) by a valve 135. The valve 135 carries a tapered head at 136 adjacent the outlet 131 of the chamber 130, annular end plate 137 at its end opposite the valve head 136 and an intermediate piston head 138, of a smaller effective area than end plate 137, which cooperates with the valve head 136 and end plate 137 to define the pressurizable compartments 132, 133 and 134. The piston head 138 is spaced from the valve head 136 to permit flow from the branch passage 128 into the chamber 132. Resilient means, such as spring 140a may be positioned in chamber 134 and bottomed against the end wall 134a for urging the end plate 137 and valve 135 to the normally closed position with the tapered valve 136 seated in a complementarily tapered surface of the outlet 131 of the chamber.

Spaced from the chamber 130 and preferably axially aligned therewith is a second chamber 140, shown in FIGURE 9, having a tapered outlet 141. A valve 142 similar in construction and operation to the valve 135 is positioned in the chamber 140 and includes a valve head 143, divider piston 144 and end plate 145 of a larger effective area than the piston 144. A spring 146 urges the valve 142 to the normally closed position with the valve head 143 closing outlet 141 of the chamber. The valve plate 145 and piston 144 define a pressurizable compartment 148 whereas the piston head 144 and valve head 143 define a pressurizable compartment 149 communicating with the branch passage 129 (FIGURE 9).

The main passage 120 in the housing communicates with a passage 150 which supplies the pressurizing medium to a collection or accumulator chamber 151 formed in the housing. Chamber 151 communicates with a pair of passages 152 and 153 respectively which supply the pressurized medium to the chambers 133 and 148 respectively. Restrictions 154 and 155 or venturi type orifices may be employed in the inlets to passages 152 and 153. The restrictions or orifices are sized with respect to the flow characteristics of the pressurized medium employed, such as hot gases, and to the desired control pressures in the valve assemblies in chambers 130 and 140.

In the housing 122, the passages 152 and 153 communicate with bleed outlet passages 156 and 157 which discharge from the housing, preferably from an extension 158 of the housing 122 (FIGURE 8), and are preferably axially aligned for purposes hereinafter more fully disclosed.

Thus, the pressurized medium, such as the hot gas, flows through the branch passages 128 and 129 into chambers 132 and 149 and cooperate with the springs 140a and 146 to maintain the valve heads 136 and 143 in the normally closed position. Similarly, the pressurized medium flowing through passage 150 and from the accumulator 151 through branch passages 152 and 153 cooperate to maintain the valves in the closed positions.

The outlet 131 of chamber 130 is connected through an appropriate fitting to a passaged housing 160 and the passage 161 (FIGURE 7) of the housing 160 communicates through a pair of passages 162 and 163 with the conduits 13 and 14 for supplying the pressurized medium to the nozzles 21 and 22 shown in FIGURE 10. Similarly, the outlet 141 of chamber 140 communicates with a passaged housing 165 (FIGURE 6) which communicates with a pair of passages 166 and 167 which are connected through an appropriate fitting to conduits 115 and 116 for supplying the pressurized medium to the nozzles 23 and 24.

Signal responsive means for selectively controlling opening of the valves 135 and 142 may include a conventional torque motor 168 which may be mounted on a bracket 168a secured to the housing 122. The torque motor 168 may be operatively responsive to a signal received from a remote source, such as the auto pilot system or guidance unit 194 of the vehicle with which employed for moving a reciprocable shaft 170 of the torque motor in the directions shown by the arrows in FIGURE 9.

The reciprocable torque motor shaft 170 carries a U-shaped member 171 having opposed flapper valve ends 172 and 173 thereof positioned adjacent the outlets 174 and 175 of the bleed passages 156 and 157.

Thus, movement of the flapper end 172 to the left position shown by the dotted lines in FIGURE 9 will move the flapper end 173 proportionately closer to the outlet 175 of the bleed passage 157. Conversely, movement of the torque motor shaft 170 to the right will move flapper valve end 172 closer to the bleed outlet 174 and the flapper member 173 a proportionate distance away from the bleed out 175.

As the distance between the flapper end 173, for example, and its corresponding outlet 175 is reduced, a pressure build up occurs in passage 153 and consequently in chamber 148. The pressure forces in chamber 148 exceed the preload of spring 146 moving the valve 142 to the left as viewed in FIGURE 9 and opening the outlet 141 to permit flow of the pressurized medium from chamber 149 into the branch passages 166 and 167 and thus through the conduits 115 and 116 to the roll control nozzles 23 and 24. It will be appreciated that the decrease in pressure in bleed passage 156, passage 152 and chamber 133 will not cause movement of the valve 135 to the open position.

Movement of the flapper valve to the right from that shown in solid lines in FIGURE 9 will cause opening of the valve 135 and flow of the pressurized medium through chamber 132, the passages in housing 160 and through conduits 13 and 14 to the roll control nozzles 21 and 22. It will be appreciated that the amount of thrust or force produced by the pair of activated roll control nozzles for clockwise or counterclockwise roll control will be equal and that a single valve control device, i.e., U-shaped member 171 and torque motor 168, selectively controls operation of either valve 135 or 142 without actuating the other valve.

The torque motor 168 may be then actuated to return the shaft 170 and U-shaped member 171 to the equilibrium position wherein both flapper ends 172 and 173 are located equidistant from the corresponding outlet 174 and 175 respectively, thereby decreasing pressure in either chamber 133 or 148 and thereby the force applied on the valve 135 or 142 is below the preload level of either spring 140a or 146 which then returns the valve 135 or 142 to the closed position terminating flow to the activated jet nozzles.

Gas generator

The gas generator 19 includes a housing mounted as by bracket 180 to the end wall of the vehicle 11 in angled relation with the main gas discharge nozzle and defines a reaction chamber 181. An end burning solid propellant 182 is contained in the reaction chamber and ignition means, such as a squib 182a is provided for igniting the solid propellant. The housing may comprise a two-piece assembly including a closed sleeve 180a and end cap 180b secured to the sleeve 180a as by threads 183. The end cap 180b is provided with an inturned centrally located projection 184 apertured as at 184a to provide communication with the reaction chamber 181.

A manifold valve fitting 185 is threaded into the projection 184 for communicating with the reaction chamber for discharging the gases therefrom. The manifold fitting 185 is apertured as at 186 to communicate the outlet passage 187 thereof with a relief valve assembly, generally indicated by the numeral 188. The relief valve assembly 188 includes a valve member 189 biased to the closed position by resilient means such as spring 190.

Movement of the valve 189 upwardly as viewed in FIGURE 3 when the pressurized medium pressure exceeds the precalibrated load on the spring 190 permits discharge of the pressurized medium through a relief valve outlet 192 which communicates with a conduit 193 for discharging the pressurized medium overboard from the vehicle.

Thus means are provided for maintaining the pressure level of the gases flowing from the gas generator.

The gas generator communicates through conduit 120 to the single valve assembly 20 for roll control which is actuated by a signal received over line 199 from the guidance unit 194. The manifold fitting 185 communicates the pitch actuator unit 17 through conduit 195 and the yaw actuator unit 18 through conduit 196. Pitch signals are received over line 197 from the guidance unit 194 and yaw control signals are received over the line 198 from the guidance unit 194.

Similarly the igniter is energized by a signal received from the guidance unit over line 182b.

In operation, before the vehicle is launched, the ground equipment, generally indicated by the numeral 200, is connected as by an umbilical connector 201 to the guidance unit or the umbilical connector may be employed for checking out the attitude control system.

During launching of the vehicle, the ground equipment 200 energizes the igniter of the hot gas generator, ignites the propellant, and gases flow through the lines to the roll control valve 20, pitch actuator unit 17 and yaw actuator unit 18. As the vehicle leaves the launching pad (not shown) the umbilical connector is disconnected and the guidance unit in response to an electrical signal takes command of the attitude control system.

If an error in attitude about the pitch or yaw axes is detected, the guidance unit is actuated to tilt or move the main nozzle and provide thereby a correcting force to return the vehicle to the programmed trajectory and orientation. Similarly, the guidance unit is activated to control operation of the roll control valve unit 20 for correcting orientation of the vehicle about its roll axis.

Thus, it will be appreciated with the present invention, simple, miniaturized and light weight components are provided for an attitude control system for controlling the orientation of an air or space borne vehicle in flight.

Although various minor modifications of the present invention might be suggested by those versed in the art, it should be understood that I wish to embody within the scope of the patent warranted hereon all such embodiments as reasonably and properly come within the scope of my contribution to the art.

I claim as my invention:

1. In a system for controlling the attitude of air and space borne vehicles comprising in combination:
   a reaction motor for generating exhaust gases to provide the thrust for propelling the vehicle,
   said reaction motor having an open gas discharge end with a fixed annular gas discharge sleeve connected thereto,
   a main thrust nozzle extending into said discharge nozzle and communicating with the reaction motor for discharge of the gases generated in the reaction motor,
   means connected to the interior of said fixed sleeve and the interior of the main thrust nozzle to provide a continuous exhaust gas flow surface between the fixed sleeve and the main thrust nozzle,
   annular seal means connected to the main thrust nozzle and the fixed sleeve to provide a gas seal therebetween,
   a gimbal ring surrounding said fixed sleeve,
   first pivot means connecting the gimbal ring to the thrust nozzle to pivot the thrust nozzle about a first control axis,
   second pivot means connecting the gimbal ring to the fixed sleeve to pivot the thrust nozzle about a second control axis transverse to said first control axis, and
   means for selectively moving the gimbaled main thrust nozzle about its control axis for controlling the attitude of the vehicle about its pitch and yaw axes.

2. In a system for controlling the attitude of air and space borne vehicles comprising in combination:
   a reaction motor for generating exhaust gases to provide the thrust for propelling the vehicle,
   said reaction motor having an open gas discharge end with a fixed annular gas discharge sleeve connected thereto,
   a main thrust nozzle extending into said discharge nozzle and communicating with the reaction motor for discharge of the gases generated in the reaction motor,
   means connected to the interior of said fixed sleeve and the interior of the main thrust nozzle to provide a continuous exhaust gas flow surface between the fixed sleeve and the main thrust nozzle.
   a flexible socket means connected to the fixed sleeve and the main thrust nozzle to provide for pivotal movement of the main thrust nozzle relative to the fixed sleeve,
   annular seal means connected to the flexible socket means and the fixed sleeve to provide a gas seal therebetween,
   a gimbal ring surrounding said fixed sleeve,
   first pivot means connecting the gimbal ring to the thrust nozzle to pivot the thrust nozzle about a first control axis,
   second pivot means connecting the gimbal ring to the fixed sleeve to pivot the thrust nozzle about a second control axis transverse to said first control axis, and
   means for selectively moving the gimbaled main thrust nozzle about its control axis for controlling the attitude of the vehicle about its pitch and yaw axes.

3. In a system for controlling the attitude of air and space borne vehicles comprising in combination:
   a reaction motor for generating exhaust gases to provide the thrust for propelling the vehicle,
   said reaction motor having an open gas discharge end with a fixed annular gas discharge sleeve connected thereto,
   a main thrust nozzle extending into said discharge nozzle and communicating with the reaction motor for discharge of the gases generated in the reaction motor,
   a flexible ball and socket type joint means connected to the interior of the fixed sleeve and the main thrust nozzle to provide for pivotal movement of the main thrust nozzle relative to the fixed sleeve,
   means connected to the interior of said fixed sleeve and the interior of the main thrust nozzle to provide a continuous exhaust gas flow surface between the fixed sleeve and the main thrust nozzle,
   annular seal means connected to the socket means and the fixed sleeve to provide a gas seal therebetween,
   a gimbal ring surrounding said fixed sleeve,
   first pivot means connecting the gimbal ring to the thrust nozzle to pivot the thrust nozzle about a first control axis, second pivot means connecting the gimbal ring to the fixed sleeve to pivot the thrust nozzle about a second control axis transverse to said first control axis, and means for selectively moving the gimbaled main thrust nozzle about its control axis for controlling the attitude of the vehicle about its pitch and yaw axes.

4. In a system for controlling the attitude of air and space borne vehicles comprising in combination:

a reaction motor for generating exhaust gases to provide the thrust for propelling the vehicle, said reaction motor having an open gas discharge end with a fixed annular gas discharge sleeve connected thereto, a main thrust nozzle extending into said discharge nozzle and communicating with the reaction motor for discharge of the gases generated in the reaction motor, means connected to the interior of said fixed sleeve and the interior of the main thrust nozzle to provide a continuous exhaust gas flow surface between the fixed sleeve and the main thrust nozzle, a first flexible cup-shaped member connected to the fixed sleeve, a second flexible cup-shaped member connected to the main thrust nozzle, said first and second cup members having overlapping portions to form a ball and socket type joint therewith to provide for pivotal movement of the main thrust nozzle relative to the fixed sleeve, annular seal means connected to one of the flexible cup members and the fixed sleeve to provide a gas seal therebetween, a gimbal ring surrounding said fixed sleeve, first pivot means connecting the gimbal ring to the thrust nozzle to pivot the thrust nozzle about a first control axis, second pivot means connecting the gimbal ring to the fixed sleeve to pivot the thrust nozzle about a second control axis transverse to said first control axis, and means for selectively moving the gimbaled main thrust nozzle about its control axis for controlling the attitude of the vehicle about its pitch and yaw axes.

5. In a system for controlling the attitude of air and space borne vehicles comprising in combination:

a reaction motor for generating exhaust gases to provide the thrust for propelling the vehicle, said reaction motor having an open gas discharge and with a fixed annular gas discharge sleeve connected thereto, an inturned annular flange extending adjacent one end of the fixed sleeve, a first flexible cup-shaped member connected to said annular flange, a main thrust nozzle extending into said discharge nozzle and communicating with the reaction motor for discharge of the gases generated in the reaction motor, means connected to the interior of said fixed sleeve and the interior of the main thrust nozzle to provide a continuous exhaust gas flow surface between the fixed sleeve and the main thrust nozzle, a second flexible cup-shaped member connected to the main thrust nozzle and having both ends spaced axially from the flange and being radially and axially spaced with respect to the first cup member such that a portion thereof extends axially between the fixed sleeve and the first cup member, annular seal means connected to the second cup member and the fixed sleeve to provide a gas seal therebetween, said first and second cup-shaped members cooperating with each other to provide a ball and socket type joint between the fixed sleeve and the main thrust nozzle to provide for pivotal movement of the main thrust nozzle relative to the fixed sleeve, a gimbal ring surrounding said fixed sleeve, first pivot means connecting the gimbal ring to the thrust nozzle to pivot the thrust nozzle about a first control axis, second pivot means connecting the gimbal ring to the fixed sleeve to pivot the thrust nozzle about a second control axis transverse to said first control axis, and means for selectively moving the gimbaled main thrust nozzle about its control axis for controlling the attitude of the vehicle about its pitch and yaw axes.

References Cited by the Examiner

UNITED STATES PATENTS

| | | | |
|---|---|---|---|
| 2,621,871 | 12/1952 | Robert | 102—50 X |
| 2,850,977 | 9/1958 | Pollak | 102—50 X |
| 2,868,478 | 1/1959 | McCloughy | 244—52 |
| 2,974,594 | 3/1961 | Boehm | 102—50 |
| 3,058,304 | 10/1962 | Corbett | 60—35.54 X |
| 3,069,853 | 12/1962 | Eder | 60—35.6 X |

OTHER REFERENCES

"The Vanguard Control System," Astronautics Magazine, October 1957, by Leonard Arnowitz, pages 34, 35, 36 and 84.

Space/Aeronautics, February 1960, pages 46–49.

MILTON BUCHLER, *Primary Examiner.*

EMILE PAUL, ARTHUR M. HORTON, SAMUEL FEINBERG, *Examiners.*

L. C. HALL, R. F. STAHL, *Assistant Examiners.*